(12) United States Patent
Sakoda

(10) Patent No.: US 8,249,093 B2
(45) Date of Patent: Aug. 21, 2012

(54) COMMUNICATION METHOD AND COMMUNICATION DEVICE AS WELL AS COMPUTER PROGRAM

(75) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 213 days.

(21) Appl. No.: 12/717,680

(22) Filed: Mar. 4, 2010

(65) Prior Publication Data

US 2010/0157967 A1 Jun. 24, 2010

Related U.S. Application Data

(63) Continuation of application No. 12/111,680, filed on Apr. 29, 2008, which is a continuation of application No. 10/505,696, filed as application No. PCT/JP2004/001028 on Feb. 3, 2004, now Pat. No. 7,653,043.

(30) Foreign Application Priority Data

Feb. 3, 2003 (JP) ................................. 2003-026461

(51) Int. Cl.
*H04L 12/413* (2006.01)
(52) U.S. Cl. ........................................ 370/445; 370/447
(58) Field of Classification Search ........................ None
See application file for complete search history.

(56) References Cited

U.S. PATENT DOCUMENTS

| 5,721,725 A | 2/1998 | Want et al. |
| 7,567,815 B2 | 7/2009 | Nishikawa et al. |
| 2002/0071448 A1* | 6/2002 | Cervello et al. ............... 370/445 |
| 2003/0123405 A1* | 7/2003 | del Prado et al. ............. 370/331 |
| 2003/0133469 A1* | 7/2003 | Brockmann et al. .......... 370/445 |
| 2006/0187964 A1* | 8/2006 | Li et al. .......................... 370/474 |
| 2008/0151860 A1 | 6/2008 | Sakoda et al. |
| 2008/0232335 A1* | 9/2008 | Del Prado Pavon et al. . 370/338 |
| 2009/0059891 A1 | 3/2009 | Sakoda et al. |
| 2009/0097440 A1 | 4/2009 | Sakoda |
| 2009/0274101 A1 | 11/2009 | Sakoda et al. |

FOREIGN PATENT DOCUMENTS

| JP | 2000-253059 | 9/2000 |
| JP | 2002-124953 | 4/2002 |
| JP | 2002-198974 | 7/2002 |

(Continued)

OTHER PUBLICATIONS

Extended European Search Report issued on Jul. 5, 2011 in corresponding European Application No. 11 16 4179.

(Continued)

*Primary Examiner* — Otis L Thompson, Jr.
(74) *Attorney, Agent, or Firm* — Oblon, Spivak, McClelland, Maier & Neustadt, L.L.P.

(57) ABSTRACT

Communication performed within a network including a plurality of communication stations is provided, in which when an access control is performed so that communication timing of a packet can not collide with that of another station by detecting a signal which is transmitted from another station, "a header area processed not to become easily an error such as a physical layer header portion of a packet" which is transmitted from a communication station is made to have at least information which is required for extracting information in a payload of the packet and a field for controlling an access reservation of transmission of a packet which is generated as a result of transmission of another packet so that processing using the field can be performed.

4 Claims, 13 Drawing Sheets

FOREIGN PATENT DOCUMENTS

| | | |
|---|---|---|
| JP | 2002-223214 | 8/2002 |
| JP | 3469188 | 9/2003 |
| WO | WO 00/48367 | 8/2000 |
| WO | 03/005644 A1 | 1/2003 |

OTHER PUBLICATIONS

B. P. Crow et al., "Investigation of the IEEE 802.11 Medium Access Control (MAC) Sublayer Functions", INFOCOM '97, 16th Annual Joint Conference of the IEEE Computer and Communications Societies, vol. 1, Apr. 7, 1997, XP 010252020, pp. 126-133.

Wei Ye et al., "An Energy-Efficient MAC Protocol for Wireless Sensor Networks", Proceedings IEEE INFOCOM 2002, The Conference on Computer Communications, 21st Annual Joint Conference of the IEEE Computer and Communications Societies, vol. 3, Jun. 23, 2002, XP 010593724, pp. 1567-1576.

Pablo Brenner, "A Technical Tutorial on the IEEE 802.11 Protocol", Internet Citation, http://www.sss-mag.com/pdf/802_11tut.pdf, Jul. 18, 1996, XP 008102075, pp. 1-24.

Japanese Office Action issued Feb. 28, 2012, in Japanese Patent Application No. 2010-024624.

\* cited by examiner

FIG. 7

(a) RTS Frame: Frame Control | RA | TA | ACK Type | ACK SEQ | Data LEN | FCS (b) CTS Frame: Frame Control | RA | Rate | ACK Type | ACK SEQ | FCS (c) ACK Frame: Frame Control | RA | ACK SEQ | FCS (d) Data Frame: Frame Control | Addr1 | Addr2 | Addr3 | SEQ | Addr4 | ACK Type | ACK SEQ | Frame Body | FCS

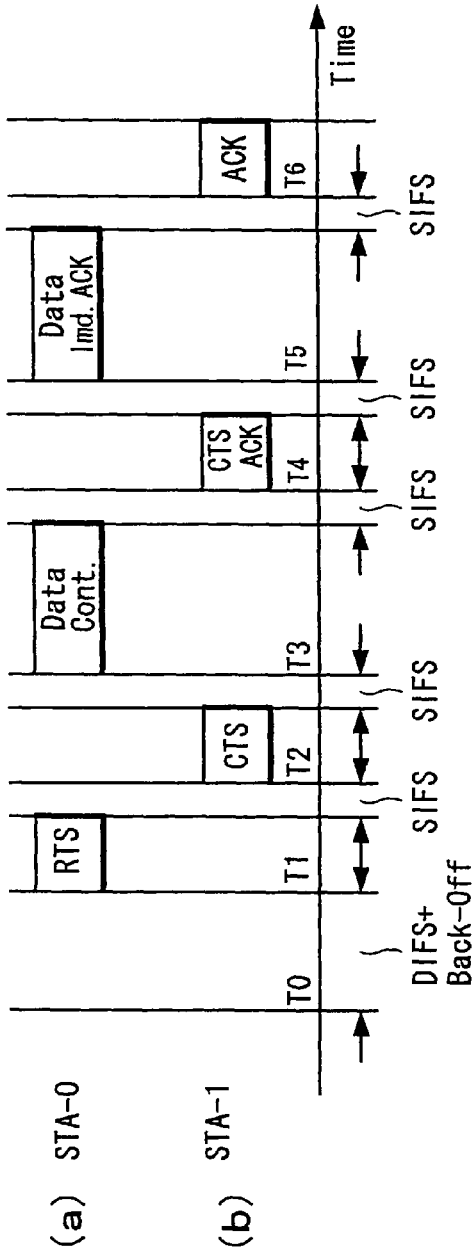
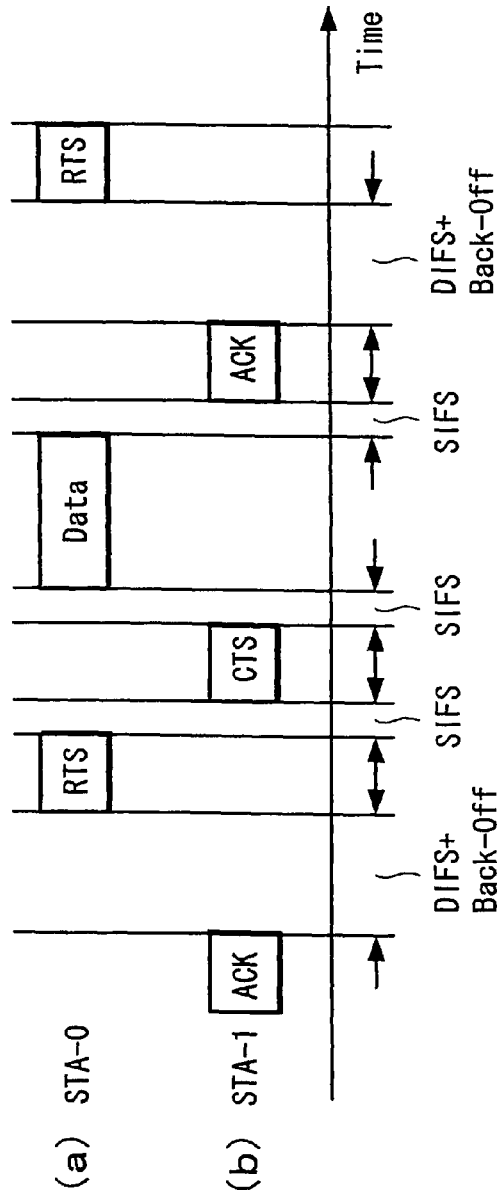
FIG. 10
FIG. 11

(a) RTS Frame
(b) CTS/ACK Frame
(c) Data Frame

COMMUNICATION METHOD AND COMMUNICATION DEVICE AS WELL AS COMPUTER PROGRAM

CROSS-REFERENCE TO RELATED APPLICATIONS

This application is a continuation of U.S. application Ser. No. 12/111,680, filed Apr. 29, 2008, which is a continuation of U.S. patent application Ser. No. 10/505,696 filed on Aug. 24, 2004, which is a National Stage of PCT/JP2004/001028, filed Feb. 3, 2004, and is based upon and claims the benefit of priority from prior Japanese Patent Application No. 2003-026461, filed Feb. 3, 2003. The entire contents of each of the above-listed applications are incorporated herein by reference.

TECHNICAL FIELD

The present invention relates to a communication method and a communication device as well as a computer program which are suitable to be applied to a wireless LAN (Local Area Network: a local information communication network) system for, for example, performing data communications and the like, and particularly relates to technology in the case where access is performed using CSMA (Carrier Sense Multiple Access)

BACKGROUND ART

Conventionally, as media access control in a wireless LAN system, the access control defined by an IEEE (The Institute of Electrical and Electronics Engineers) 802.11 method and the like have widely been known. A detailed description of the IEEE 802.11 method is provided in International Standard ISO/IEC 8802-11:1999(E) ANSI/IEEE Std 802.11, 1999 Edition, Part 11: Wireless LAN Medium Access Control (MAC) and Physical Layer (PRY) Specifications and the like.

An access competition method according to a conventional IEEE802.11 method is explained using FIG. 12. In the IEEE802.11 method, four kinds of IFS (Inter Frame Space) are defined as a packet interval. Hereupon, three kinds thereof are explained. As the IFSs, SIFS (Short IFS), PIFS (PCF IFS) and DIFS (DCF IFS) are defined in order of length from a shorter one to a longer one. In the IEEE802.11, CSMA (Carrier Sense Multiple Access) is employed as a basic medium access procedure, in which a back-off timer is operated over a random period of time while monitoring a state of medium before a transmitter transmits something and a transmission right is granted only when a transmission signal is not present during the period.

When a normal packet is transmitted in accordance with the procedure of CSMA (called DCF: Distributed Coordination Function), first the state of medium is monitored for a period of DIFS after transmission of some packet is completed, a random back-off is performed if a transmission signal is not present during this period, and the transmission right is to be granted if a transmission signal is not present further during the period. On the other hand, when a packet having an exceptionally high urgency such as ACK which is an acknowledgement response signal is transmitted, it is allowed to transmit after the SIFS packet interval. Accordingly, it is possible to transmit the packet having the high urgency earlier than a normal packet transmitted in accordance with the CSMA procedure.

This is the reason why different kinds of IFS are defined, and with respect to the conflict of packet transmission rights, the order of priority is determined depending on the IFS whether it is SIFS, PIFS or DIFS.

Next, IEEE802.11a which is an extended standard of the IEEE802.11 is referred to as an example and an explanation is made to a frame format (packet format) using FIGS. 13 and 14. FIG. 13 is a diagram showing the frame format according to the IEEE802.11a. A preamble is added to the head of each packet to indicate existence of the packet. According to the standard, a known symbol pattern is defined as the preamble, and a receiver judges based on the known pattern whether a received signal is entitled to be the preamble or not.

Subsequently to the preamble, a signal field is defined. Information required for decoding an information portion of the packet is stored in the signal field. The information required for decoding the packet is called a PLCP header (Physical Layer Convergence Protocol header), and the PLCP header includes a rate field indicating a transmission rate of an information portion (in addition, a service field which is a part of the PLCP header is also included, however hereinafter it is generally termed the information portion in order to simplify an explanation), a data length field indicating a length of the information portion, a parity bit, a tail bit of an encoder and the like. The receiver performs decoding operations of the subsequent information portions based on the result of decoding the rate and length fields of the PLCP header.

Encoding resistant to noise is applied to a signal portion which stores the PLCP header, and transmission is performed at a rate equivalent to 6 Mbps. On the other hand, the information portion in an ordinary packet is transmitted in a transmission rate mode with which the highest bit rate is provided within the range where error as little as possible is generated in accordance with SNR or the like in the receiver. As shown in FIG. 13, total eight kinds of transmission rate mode, which are 6, 9, 12, 18, 24, 36, 48, and 54 Mbps, are defined in the IEEE802.11a.

Therefore, in the case where a transmitting and receiving device is located nearby, a transmission rate mode having a high bit rate is selected, and it may not possible to decode the information in a communication station located in the distance. The information portion is transferred as PSDU (physical Layer Service Data Unit) to a link layer which is an upper layer.

FIG. 14 is a diagram showing a frame field of the PSDU. Although some frame types are defined in the IEEE802.11, hereupon only three kinds of frame, which are necessary for the explanation, are explained.

A frame control field and a duration field are defined in common in each frame. Information indicating a kind, use and the like of the frame is stored in the Frame Control field. Moreover, information on use for NAV (Network Allocation Vector), which is explained in detail later on, is stored in the Duration field, and a period of time until a transaction of the packet is completed is written therein. In a data frame, other than the above, there exist four address fields to specify a transmission source, a destination communication station and the like, a sequence field (SEQ), a frame body which is net information to be provided to an upper layer and FCS (Frame Check Sequence) which is a checksum. In an RTS frame, other than the above, there exist a receiver address (RA) which indicates a destination, a transmitter address (TA) which indicates a transmission source and FCS which is the checksum. In a CTS frame and an ACK frame, there exist, other than the above, RA which indicates the destination and FCS which is the checksum.

An RTS/CTS procedure in the IEEE802.11 is explained using FIGS. 11 and 15. In a wireless LAN network of an ad hoc environment, it is generally known that a problem of hidden terminals occurs and CSMA/CA according to the RTS/CTS procedure is known as a methodology for solving much of this problem. This methodology is employed also in the IEEE802.11.

An example of an operation in the RTS/CTS procedure is explained using FIG. 11. FIG. 11 shows an example in which some information (Data) is transmitted from a communication station STA0 to a communication station STA1. Prior to transmission of actual information, the communication station STA0 transmits an RTS (Request To Send) packet to the communication station STA1 which is a destination of the information in accordance with the CSMA procedure. When the communication station STA1 has received this packet, a CTS (Clear To Send) packet to feed back the fact that the RTS has been received is transmitted to the communication station STA0. When reception of the CTS is performed without failure in the communication station STA0 which is a transmitting side, it is considered that a medium is clear and an information (Data) packet is immediately transmitted. After the reception is completed without failure in the communication station STA1, an ACK is returned to complete a transmission and reception transaction for one packet.

Operations occurred in this procedure is explained using FIG. 15. In FIG. 15, an explanation is made to an example in which communication stations STA2, STA0, STA1 and STA3 exist and only communication stations adjacent to each other are located within the range of reaching an electric wave. Further, it is assumed to be the case in which the communication station STA0 transmits information addressed to the communication station STA1. After confirming that a medium is clear for a predetermined period of time (from time T0 to time T1) in accordance with the above described CSMA procedure, the communication station STA0 starts to transmit an RTS packet addressed to the communication station STA2 at the time T1. Information indicating that the packet is RTS is written in a frame control field of the RTS packet, a period of time until a transmission and reception transaction of that packet is completed (that is, the period of time until time T8) is written in a duration field, an address of the destination communication station (STA1) is written in a RA field, and an address thereof (STA0) is written in a TA field.

Hereupon, an attention should be paid to the point that the communication station STA0 needs to determine the time when the transaction is completed at the time when RTS is transmitted, and therefore, it is necessary to make a transmission rate mode for a CTS packet, a data packet and an ACK packet which are hereinafter transmitted and received become definite at the time when the RTS is transmitted.

This RTS packet is also received by the communication station STA2 which is located in the neighborhood of the communication station STA0. When the RTS signal is received, the communication station STA2 starts a receiving operation on discovering a preamble, and further decodes PSDU based on information obtained by decoding a PLCP header. It is recognized from the frame control field in the PSDU that the packet is the RTS packet and it is learned that the communication station STA0 is to transmit some information. Furthermore, it is recognized from the RA field that the communication station STA2 is not a destination communication station. Then, in order not to interrupt the transmission of the communication station STA0, the communication station STA2 recognizes without monitoring a medium that the medium is in an occupied state and stops transmission until the transaction is completed, that is, until the time T8 when the transmission of ACK is completed in the example shown in FIG. 15. This operation is called setting up NAV (Network Allocation Vector) or the like. In the state where NAV is set up, the NAV becomes effective over a period which is indicated in the duration field and the communication station STA2 becomes in a transmission disapproval state until the time T8.

On the other hand, this RTS packet is also received by the communication station STA1 which is the destination thereof. When by decoding PSDU the communication station STA1 recognizes similarly to the above procedure that the communication station STA0 is to transmit the packet addressed thereto, the STA1 returns the CTS packet at time T3 after an SIFS interval. The transmission rate mode of the CTS packet should be the same as that of the RTS. Moreover, it is written in the frame control field of PSDU that the packet is the CTS packet, a period of time until the transaction is completed (that is, the period of time until the time T8) is written in the duration field, and the address of the destination communication station (STA1) is written in the RA field.

This CTS packet is also received by the communication station STA3 which is located in the neighborhood of the communication station STA1. The communication station STA3 recognizes that "a certain nearby communication station expects to receive the packet until the time T8" by decoding PSDU using the procedure similar to the above. Then, in order not to interrupt the reception by the communication station STA1, the communication station STA3 sets up NAV to stop transmission until that transaction is completed. The NAV becomes effective over the period indicated in the duration field, and the communication station STA3 also becomes in a transmission disapproval state until the time T8.

On the other hand, this CTS packet is also received by the communication station STA0 which is the destination thereof. The communication station STA0 recognizes by decoding PSDU using the procedure similar to the above that the communication station STA1 is ready for the reception and starts transmission of a data packet at time T5 after the SIFS interval. When the transmission of the data packet is completed at time T6 and the communication station STA1 decodes the data without an error, the ACK is returned at time T7 after the SIFS interval and the communication station STA0 receives the ACK to complete the transmission and reception transaction for one packet at the time T8. When the time T8 has come, the communication stations STA2 and STA3 which are the neighboring communication stations take the NAV down so as to return to a normal transmission and reception state.

In brief, by exchanging the above described RTS packet and CTS packet, transmission is prohibited in "the neighboring stations to the STA0 that is the transmitting station" which received the RTS and is prohibited in "the neighboring station to the STA1 that is the receiving station" which received the CTS, so that the transmission of information addressed to the communication station STA1 from the communication station STA0 and also the return of ACK are performed without being interfered by a sudden transmission signal transmitted from neighboring stations.

Japanese Published Patent Application No. H8-98255 discloses a conventional example of such access control of wireless communications.

In the meantime, in the IEEE802.11 it has been necessary to make a transmission rate of RTS, CTS and a data packet determined at the time when the RTS is transmitted, in order to write in a duration field of the RTS a period of time until a transmission and reception transaction is completed for the packet. However, the following problems may occur according to this procedure.

Problem 1: a Reaching Range of (an RTS Packet and) a CTS Packet

Although transmission of a CTS packet should normally be addressed to all communication stations which have a possibility to interrupt reception of a data packet, according to the IEEE802.11 standard the CTS packet needs to be transmitted by the same transmission rate as the data packet and the transmission is performed between a transmitting station and a receiving station only at a transmission rate having the minimum necessary noise-proof characteristics. Therefore, since the CTS packet can be delivered only to communication stations which exist within the range up to a distance equivalent to that of the transmitting station when viewing from the receiving station (CTS transmitting station), the problem of hidden terminals cannot solved fundamentally. Further, the same can also be said with respect to the RTS packet.

Problem 2: (an Influence of a Transmission Disapproval Interval NAV)

Further, according to the IEEE 802.11, a terminal which has received an RTS/CTS packet addressed to the other terminals is made to stop transmission processing (NAV) until a transaction is completed; however, actually even communication not affecting the reception in the terminal which has transmitted the CTS has been restricted. Due to the operation, a usability of a line has not been improved.

Problem 3: an Influence when a CTS Packet has not been Returned

When "a destination station of a data packet" has not been able to receive an RTS packet correctly or when it has been set to a transmission disapproval state due to some reason, transmission of the data packet is not performed, because a CTS packet is not returned to "a transmission source station of the data packet". However, communication stations which have received the RTS packet in the neighborhood enter the transmission disapproval state until a transmission and reception transaction of the data packet is completed regardless of whether the CTS is returned or not, which is inconvenient.

Problem 4: an Imperfect Nature of a Transmission Rate

Although it is necessary to make a transmission rate of a data packet determined before an RTS packet is transmitted, a possibility that the data packet is transmitted at an optimal transmission rate corresponding to a receiving condition of a receiving station is low due to the fact that a transmitting station is not capable of obtaining the real-time receiving condition in the receiving station.

The present invention is made in light of the above problems and aims to solve problems when performing an access control in a communication system such as a wireless LAN system.

DISCLOSURE OF THE INVENTION

The present invention is communication performed within a network including a plurality of communication stations, wherein in the case where an access control in which a communication timing of a packet may not collide with that of another station by detecting a signal transmitted from another station is performed, information required for extracting information in a payload of a packet and a field that controls an access reservation for transmitting a packet generated as a result of the transmission of the packet are at least included in "a header area such as a physical layer header portion of the packet which is processed not to become an error easily"; and processing which uses the field can be performed.

Further, the present invention is communication performed within a network including a plurality of communication stations, wherein in the case where an access control in which a communication timing of a packet may not collide with that of another station by detecting a signal transmitted from another station is performed, information on a period of time until completing reception of a new packet which is generated as a result of transmission of a relevant packet is written in a field for controlling the access reservation of the packet which is transmitted from a communication station, so that processing based on the information can be performed.

Further, the present invention is communication performed within a network including a plurality of communication stations, wherein in the case where an access control in which a communication timing of a packet may not collide with that of another station by detecting a signal transmitted from another station is performed and when it is judged from a destination address included in a header of a received packet that the packet is not addressed thereto, transmission processing is suspended until the time indicated in the access reservation field included in the packet.

Furthermore, the present invention is communication performed within a network including a plurality of communication stations, wherein in the case where an access control in which a communication timing of a packet may not collide with that of another station by detecting a signal transmitted from another station is performed and when some signal is transmitted to a transmission source of a received packet after identifying an instruction to delay the return of a reception acknowledgement response signal in the received packet, the reception acknowledgement response signal is included in the signal.

According to the present invention, a reaching range of a transmission request packet and that of a transmission request acknowledgement response packet can be expanded, and therefore an excellent communication method and a communication device as well as a computer program can be provided.

Further, according to the present invention, it is possible to prevent an inconvenience when the transmission request acknowledgement response packet is not returned.

Furthermore, according to the present invention, a transmission rate used at the time of transmitting information can be judged based on the latest receiving condition, so that a selection of the transmission rate can be made precisely.

BRIEF DESCRIPTION OF DRAWINGS

FIG. 7 is an explanatory view showing an example of a frame field according to an embodiment of the present invention;

FIG. 10 is an explanatory view showing an example of a transmission and reception procedure (example 3) according to an embodiment of the present invention;

FIG. 11 is a timing chart showing an example of a conventional access control;

BEST MODE FOR CARRYING OUT THE INVENTION

Hereinafter, an embodiment of the present invention is explained by referring to FIGS. 1 through 10.

A transmission path for communication assumed in this embodiment is of wireless, and also it is assumed to be the case in which a network is established among a plurality of devices using a single transmission medium (in the case where a link is not separated by a frequency channel). However, the same can be said even if a plurality of frequency channels exist as a transmission medium. In addition, the communication assumed in this embodiment is a store-and-forward type traffic and information is transferred in a unit of packets.

Further, each communication station can also perform ad hoc communication for directly transmitting information in an asynchronous mode in accordance with an access procedure based on CSMA (Carrier Sense Multiple Access).

In an autonomous decentralized wireless communication system of this sort in which a control station is not specifically disposed, each communication station makes its presence known to other communication stations in the neighborhood (that is, within a communication range) by notifying them of beacon information on a channel and also informs them of a network structure. Since a communication station transmits a beacon at the head of a transmission frame cycle, the transmission frame cycle is defined by a beacon interval. Moreover, each communication station discovers a beacon signal transmitted from a neighboring station by performing a scanning operation on the channel only for a period of time equivalent to the transmission frame cycle and learns the network structure (or enters the network) by decoding information which is written in the beacon.

Figure 1:
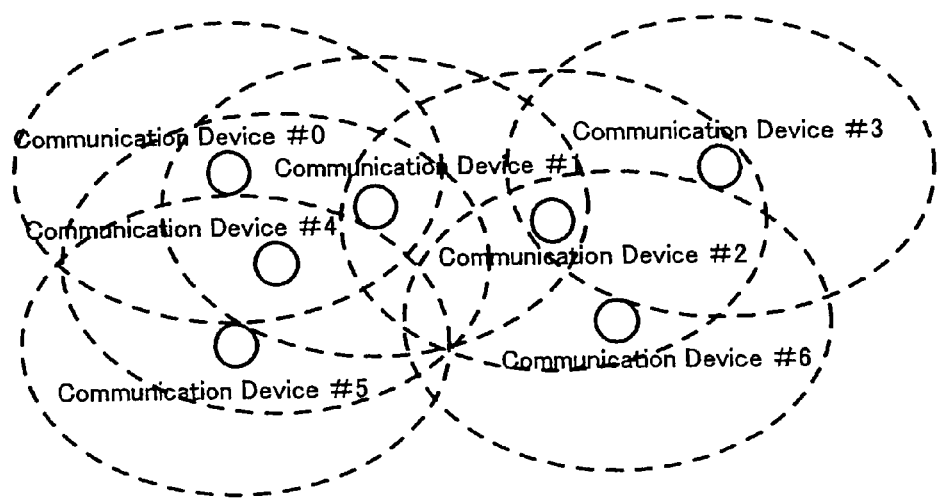
FIG. 1 is an explanatory view showing an example of an arrangement of communication devices according to an embodiment of the present invention.

FIG. 1 shows an example of an arrangement of communication devices included in the wireless communication system according to an embodiment of the present invention. In this wireless communication system, a specific control station is not disposed and each communication device operates in an autonomous decentralized manner to form an ad hoc network. In this drawing, the state in which communication devices #0 to #6 are distributed in the same space is shown.

Further, a communication range of each communication device is shown with a broken line in this drawing, and not only communication can mutually be performed with another communication device existing within the range, but also the range is defined as the one where a signal transmitted by itself interferes in others. In other words, the communication device #0 is located within the range where communication with the communication devices #1 and #4 which exist in the neighborhood can be performed; the communication device #1 is located within the range where communication with the communication devices #0, #2 and #4 which exist in the neighborhood can be performed; the communication device #2 is located within the range where communication with the communication devices #1, #3 and #6 which exist in the neighborhood can be performed; the communication device #3 is located within the range where communication with the communication device #2 which exists in the neighborhood can be performed; the communication device #4 is located within the range where communication with the communication devices #0, #1 and #5 which exist in the neighborhood can be performed; the communication device #5 is located within the range where communication with the communication device #4 which exists in the neighborhood can be performed; and the communication device #6 is located within the range where communication with the communication device #2 which exists in the neighborhood can be performed.

When the communication is performed between certain specific communication devices, there exists a "hidden terminal", that is, a communication device which can be heard by a communication device of a communication partner on one side but cannot be heard by a communication device on the other side.

Figure 2:
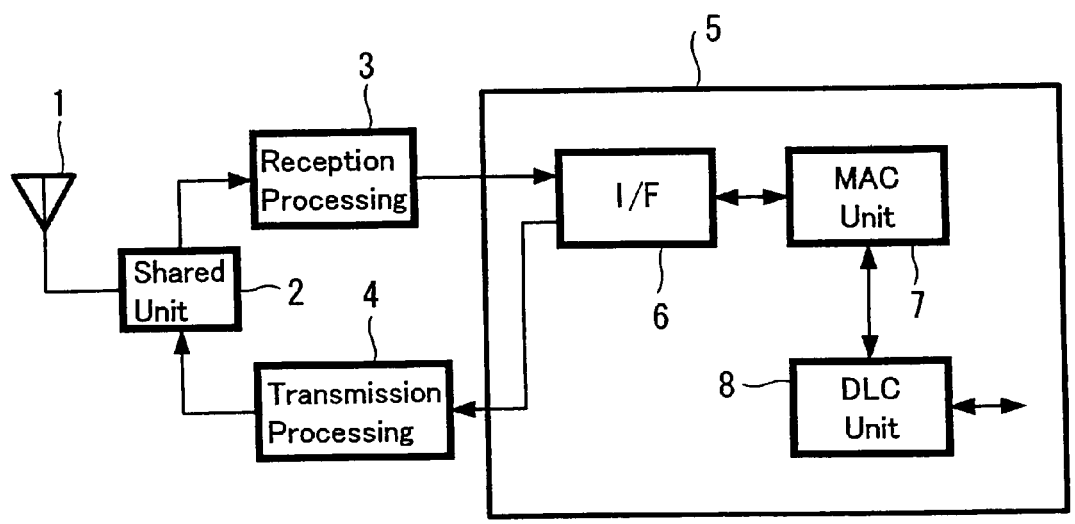
FIG. 2 is a block diagram showing an example of a configuration of a communication device according to an embodiment of the present invention.

FIG. 2 is a block diagram showing an example of a configuration of a wireless transmitting and receiving device constituting a communication station applied to the system of this embodiment. In this example, an antenna 1 is connected to a reception processing unit 3 and a transmission processing unit 4 through an antenna shared unit 2, and the reception processing unit 3 and the transmission processing unit 4 are connected to a base-band unit 5. With respect to a reception processing method in the reception processing unit 3 and a reception processing method in the transmission processing unit 4, various communication methods suitable for comparatively short range communication and applicable to a wireless LAN can be applied, for example. Specifically, a UWB (Ultra Wideband) method, an OFDM (Orthogonal Frequency Division Multiplex) method, a CDMA (Code Division Multiple Access) method and the like can be applied.

The base-band unit 5 includes an interface 6, an MAC (Medium Access Control) unit 7, a DLC (Data Link Control) unit 8 and the like, and processing in each layer according to an access control method which is implemented in this communication system is performed in respective processing units.

Figure 3:
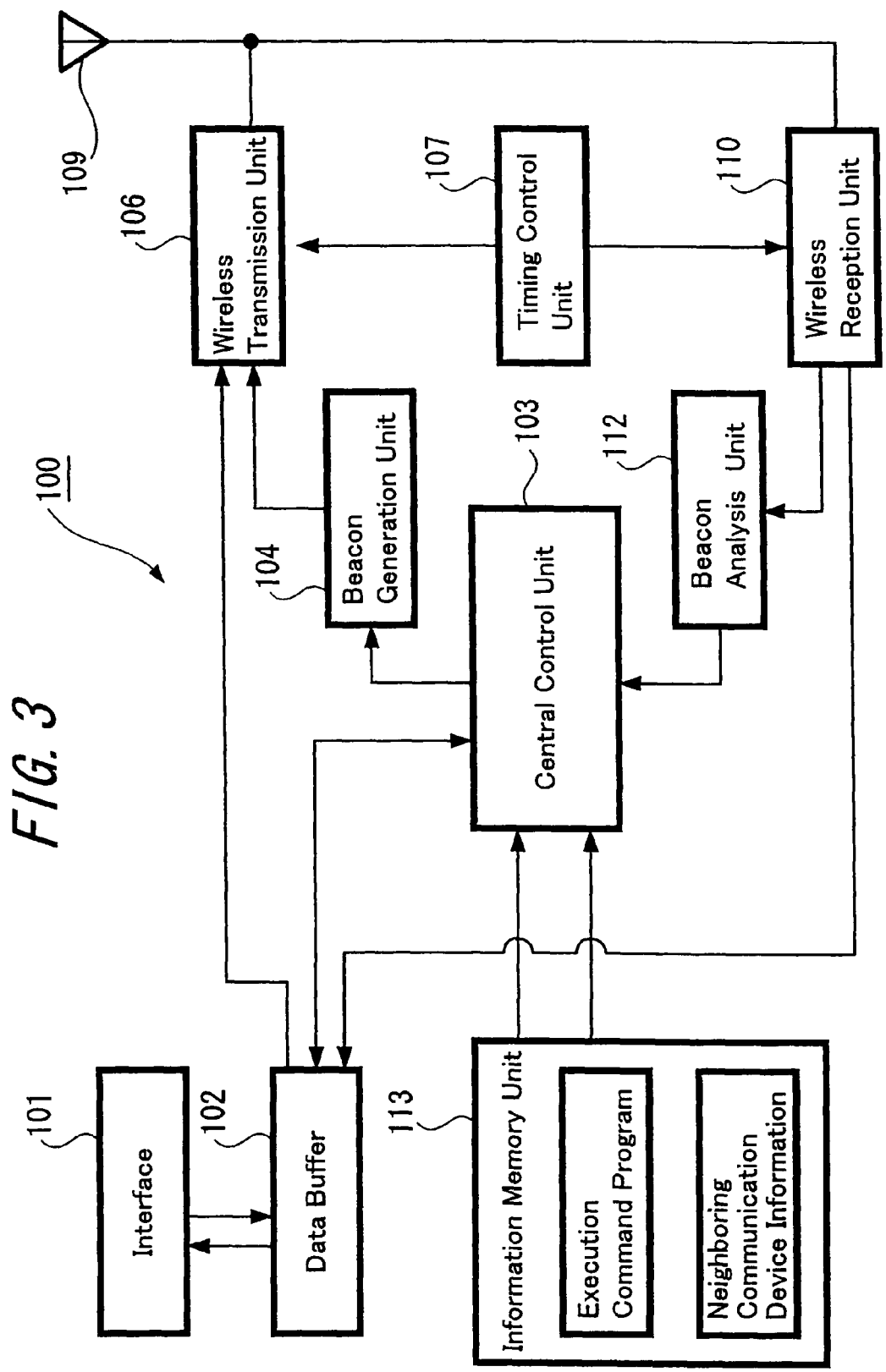
FIG. 3 is a block diagram showing an example of a detailed configuration of a communication device according to an embodiment of the present invention.

FIG. 3 shows further in detail a functional structure of a wireless communication device which operates as a communication station in a wireless network according to an embodiment of the present invention. The wireless communication device shown in the drawing can form a network while avoiding a collision by efficiently performing a channel access within the same wireless system under a communication environment of an autonomous decentralized type in which a control station is not disposed.

As shown in FIG. 3, a wireless communication device 100 includes: an interface 101, a data buffer 102, a central control unit 103, a beacon generation unit 104, a wireless transmission unit 106, a timing control unit 107, an antenna 109, a wireless reception unit 110, a beacon analysis unit 112 and an information memory unit 113.

The interface 101 exchanges various information sets with an external device (for example, a personal computer (not shown) and the like) which is connected to the wireless communication device 100.

The data buffer 102 is used for temporarily storing data transmitted from a connected device through the interface 101 and for temporarily storing data received through a wireless transmission path before sent out through the interface 101.

The central control unit 103 unitarily performs management of a series of information transmission and reception processing and access control of a transmission path in the wireless communication device 100. An operation control such as, for example, collision avoidance processing at the time of beacon collision is performed in the central control unit 103. As a processing procedure for the collision avoidance, a shift of a beacon transmission position of the station, a suspension of beacon transmission thereof, a request to another station for a change of a beacon transmission position (a shift of the beacon transmission position or a suspension thereof) and the like can be listed; and details of those processing procedures will be described later on.

The beacon generation unit 104 generates a beacon signal which is periodically exchanged with neighboring wireless communication devices. In order for the wireless communication device 100 to make use of a wireless network, the beacon transmission position thereof, a beacon reception position from a neighboring station and the like are specified. Those pieces of information are stored in the information memory unit 113 and also neighboring wireless communication device are informed thereof by writing the information within the beacon signal. With respect to the structure of a beacon signal, an explanation is made later on. Since the wireless communication device 100 transmits a beacon at the head of a transmission frame cycle, the transmission frame cycle in a channel used by the wireless communication device 100 is defined by a beacon interval.

The wireless transmission unit 106 performs predetermined modulation processing to wirelessly transmit data and the beacon signal temporarily stored in the data buffer 102. Also, the wireless reception unit 110 performs reception processing of information and a signal such as a beacon signal sent from another wireless communication device at a predetermined time.

As a wireless transmission and reception method in the wireless transmission unit 106 and the wireless reception unit 110, various communication methods, for example, suitable for comparatively short range communication and applicable to a wireless LAN can be applied. Specifically, a UWB (Ultra Wide Band) method, an OFDM (Orthogonal Frequency Division Multiplexing) method, a CDMA (Code Division Multiple Access) method and the like can be employed.

The antenna 109 wirelessly transmits a signal addressing to another wireless communication device on a predetermined frequency channel, or collects a signal which is transmitted from another wireless communication device. In the configuration of FIG. 3, only one antenna is provided, so that transmission and reception can not be performed in parallel.

The timing control unit 107 performs timing control for transmitting and receiving a wireless signal. For example, beacon transmission timing thereof at the head of a transmission frame cycle, beacon reception timing from another communication device, timing of data transmission and reception with another communication device as well as a scanning operation cycle and the like are controlled.

The beacon analysis unit 112 analyzes a beacon signal received from a neighboring station and analyzes the presence of a wireless communication device in the neighborhood and the like. For example, information such as a beacon reception timing in an adjacent station and reception timing regarding a beacon in the neighborhood is stored in the information memory unit 113 as neighboring device information.

The information memory unit 113 stores an execution procedure command (a program describing the collision avoidance processing procedure and the like) such as a series of access control operation which is performed in the central control unit 103, the neighboring device information obtained from an analyzed result of the received beacon, and the like.

Figure 4:
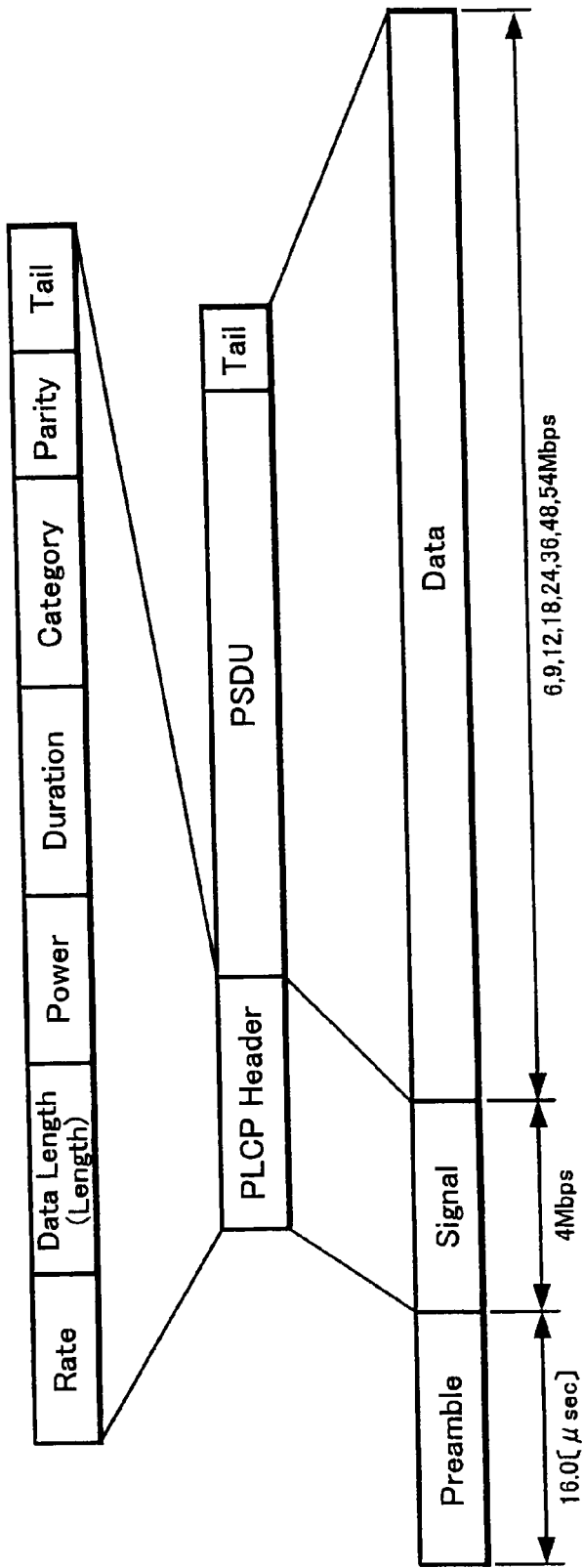
FIG. 4 is an explanatory view showing an example of a frame format according to an embodiment of the present invention.
Figure 14:
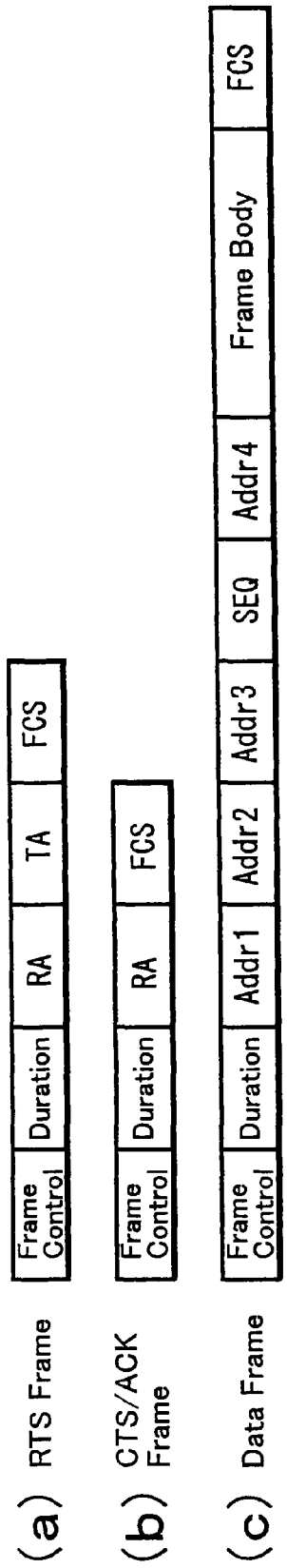
FIG. 14 is an explanatory view showing an example of a conventional frame field.

Next, an example of a frame format of a packet according to this embodiment is shown in FIG. 4. A preamble indicating an existence of the packet is added to the head of each packet. Then, a signal field is defined following the preamble. In the signal field, information required for decoding an information portion (payload) of the packet is stored, in which a rate field indicating a transmission rate of the information portion, a data length field indicating a length of the information portion, a parity bit, a tail bit of an encoder and the like are included. To this point, the frame format is the same as prior art (the example of FIG. 14).

Furthermore, in this embodiment, "a PLCP header of a physical layer header is assumed to be a header area which is processed not to become an error easily", and as fields of the PLCP header which is the physical layer header, there exist a power field indicating transmission power of the packet; a duration field indicating the duration after a completion of transmission and reception of the packet until finishing transmission of a packet which is to be transmitted as a result of the reception of the above packet; and a category field which includes information on whether an confirmation of a reception response is performed or not prior to the transmission of that packet.

For example, when the communication device #0 transmits data to the communication device #1, in order to secure transmission of a CTS packet of the communication device #1 which is generated as a result of an RTS packet transmitted by the communication device #0, a period of time until the transmission of CTS from the device #1 is completed is written in the duration field of the RTS packet. Since other terminals withhold from transmitting until the transmission of the CTS is completed, transmission of the CTS packet from the communication device #1 can be secured. Similarly, a period of time until transmission of an ACK from the device #1 is completed is written in the duration field of a data packet transmitted from the communication device #0 to the communication device #1. Therefore, according to this embodiment, with respect to time information that is set in the duration field, a transmission rate of the next packet to be transmitted is determined considering a transmission quality of a packet which has been received immediately before and a duration value calculated from the determined transmission rate can be set. Accordingly, since a station which transmits RTS has conventionally determined a data rate to calculate a duration value at the time of transmitting the RTS, there has been a problem that an alteration of a transmission rate due to a change of condition thereafter in a transmission path can not be taken into consideration; however, such problem does not occur according to this embodiment.

Further, according to this embodiment, since control is performed so as not to set NAV which is longer than required regardless of the kind of a transmitted packet (RTS, CTS, Data, ACK and the like), a usability of a medium is improved.

In addition, although it may be determined that a period of time from a transmission start time of a relevant packet until completing transmission of a packet transmitted as a result of reception of the relevant packet is stored in the duration field, an operation thereof is almost the same as the prior art except that transmission of the packet within the period of transmission time is unconditionally disapproved, and therefore an explanation thereof is omitted in the following.

Originally, only information required for receiving the relevant packet is written in a PLCP header; however in this embodiment not only the above but also preliminary information on "whether or not a reception response confirmation is performed prior to the transmission of the packet" and reservation information on the following packet regarding "the following packet to be transmitted as a result of the reception of that packet" are written in the PLCP header. Further, there is also a case in which the transmission power of the relevant packet is also written to be used as one piece of information for deciding transmission power on a receiving side. The rest remains the same as the prior art. Although an example in which all such fields are defined is explained hereinafter for simplifying the explanation, all of the fields are not necessarily defined to obtain the effectiveness of the present invention.

When recognizing reception of a packet and judging from the result of decoding a PSDU that the packet is not addressed thereto, each communication station performs processing of making transmission always disapproved over the period of time which is indicated by a duration field in a PLCP header.

Moreover, in the case where the reception of the packet is recognized and it is judged from the result of decoding the PSDU that the packet is not addressed thereto and when information indicating that "a confirmation of a reception response has not been performed prior to the transmission of the packet" is extracted from a category field in the PLCP header, each communication station makes a reception operation stopped at the time when it is judged that the packet is not addressed thereto and makes a shift into a normal transmission and reception state.

An encoding particularly resistant to noise, that is, excellent in noise characteristics is applied to a signal portion in which the PLCP header is stored, and the portion is transmitted at, for example, around 4 Mbps which is lower than the minimum rate for transmitting an information portion (payload portion). Further, when a reception SNR is low such that the reception power is too low, a preamble portion can not be discovered and it is not possible to recognize that the packet is received. Therefore, when it is recognized that the packet has been received, a duration field can be extracted without an error regardless of a transmission rate of the information portion.

FIG. 7 is a diagram showing frame fields of PSDU. Hereupon, an explanation is made with respect to only four kinds of frame which are necessary for explaining different aspects from prior art.

In each frame, a frame control field in which information indicating a kind, use and the like of the frame is stored is defined in common. A duration field conventionally existed is not arranged in this field, because according to this embodiment the duration field is transmitted in a PLCP header that is a physical layer header. In a data frame, an ACK type field indicating an ARQ method and an ACK SEQ field indicating an object frame of ACK exist in addition to fields which have conventionally been defined. In an RTS frame, an ACK type field indicating an ARQ method, an ACK SEQ field indicating the object frame of ACK and a data length field indicating the number of bits of a data frame transmitted later on exist in addition to fields which have conventionally been defined. In a CTS frame, a rate field indicating a transmission rate of the data frame transmitted later on, an ACK type field indicating the ARQ method and an ACK SEQ field indicating the object frame of ACK exist in addition to fields which have conventionally been defined. In an ACK frame, an ACK SEQ field indicating the object frame of ACK exists in addition to fields which have conventionally been defined.

When a packet is received, a communication station judges whether the packet is addressed thereto or not by referring to a destination address field of a frame, which is similar to prior art examples.

CSMA Procedure

Figure 6:
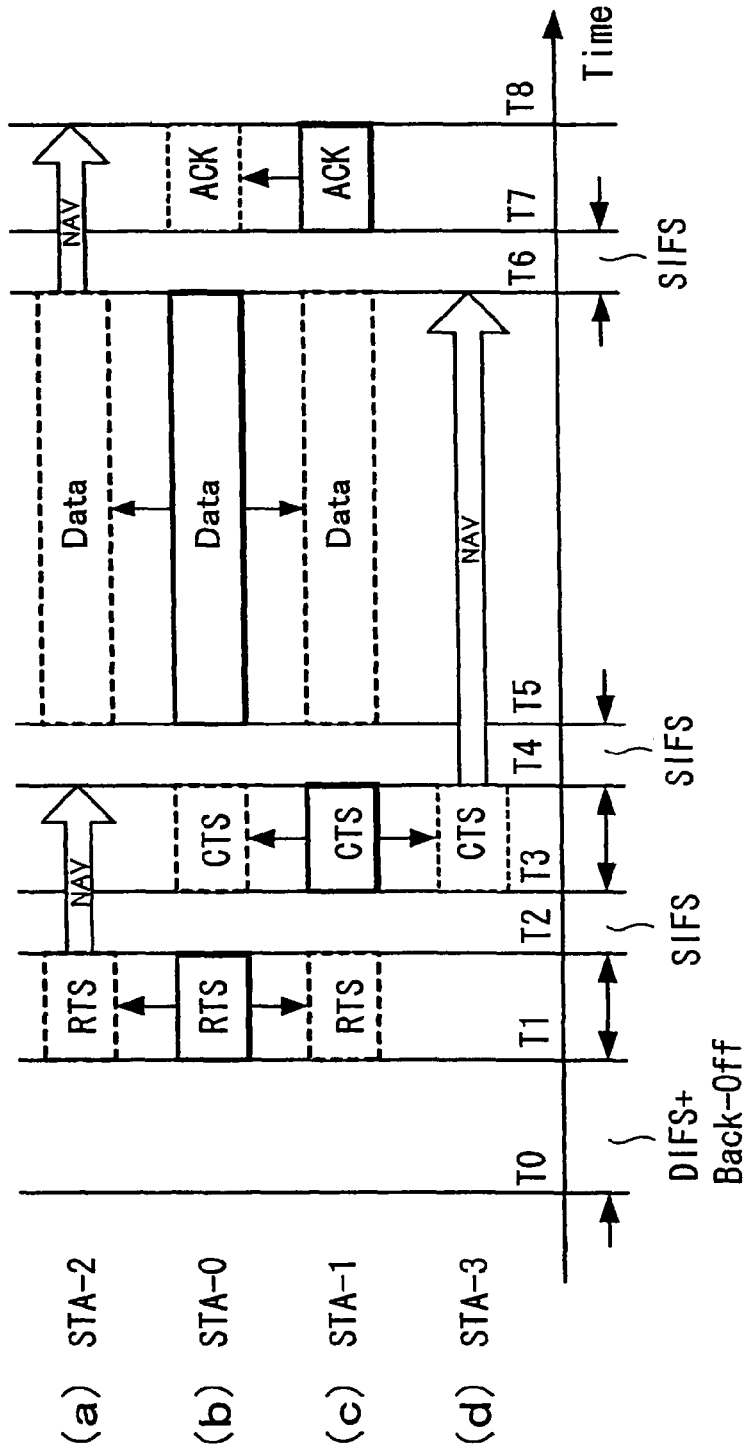
FIG. 6 is a timing chart showing an example of CSMA/CA (example 2) according to an embodiment of the present invention.

FIG. 6 is a diagram showing an example of an RTS/CTS procedure according to this embodiment.

Figure 15:
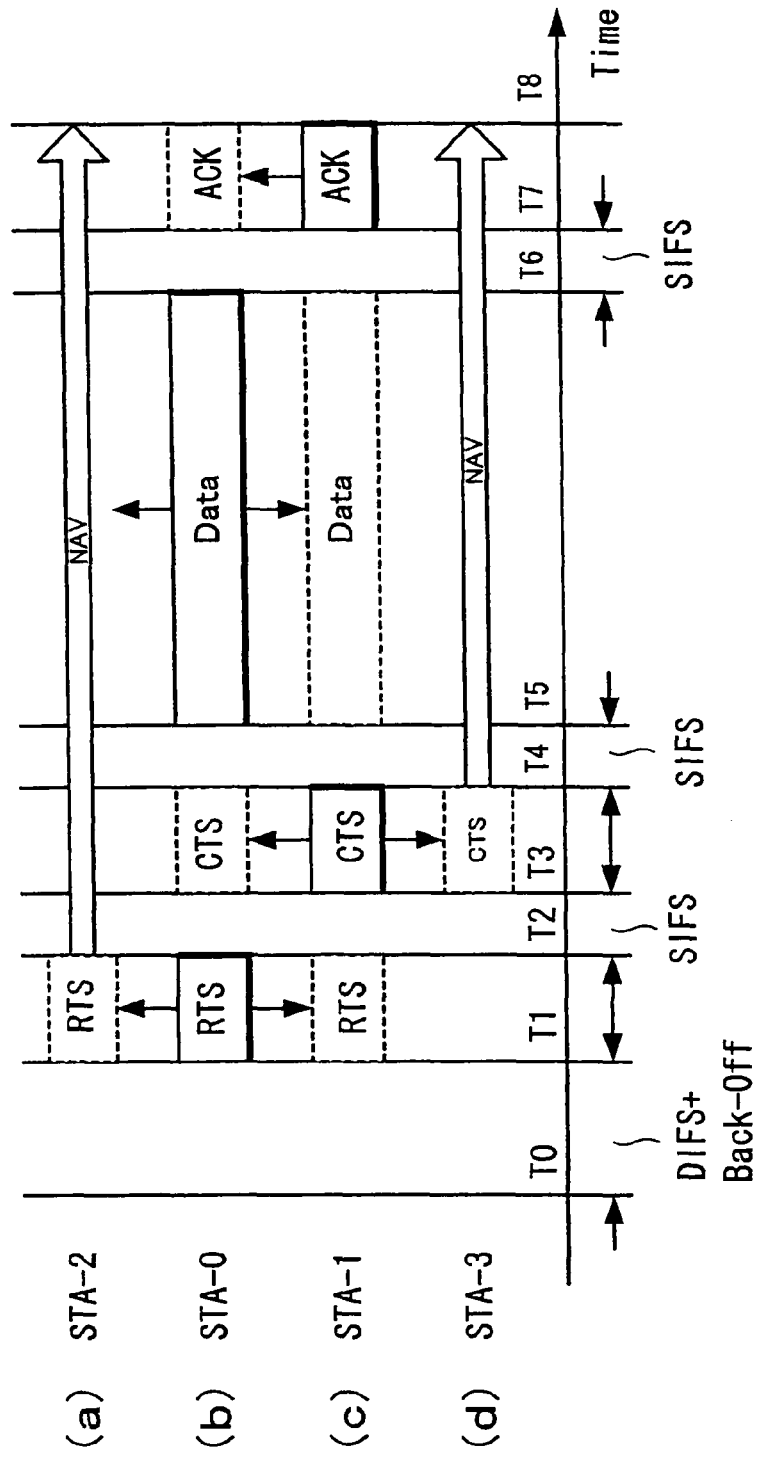
FIG. 15 is a timing chart showing an example of a conventional CSMA/CA.

The same state as that explained in the prior art example of FIG. 15 is assumed in FIG. 6. Hereunder, explanation is mainly given with respect to what is different from the prior art, and an explanation of procedures similar to prior art examples is partly omitted.

After confirming that a medium has been clear for a certain period of time (from time T0 to time T1) based on a conventional CSMA procedure, the communication station STA0 starts to transmit an RTS packet addressed to the communication station STA2 at the time T1. A period of time (that is, the period of time from T2 to T4) until completing reception of CTS which is transmitted as a result of receiving RTS is written in a duration field of the RTS packet. Here, it is also possible to give some margin to the period of time until the time T4, so that a period of time until around time T5 is written as a time length written in the duration field. Further, information indicating that "there has been no exchange of a packet with a receiving side prior to the transmission of the packet (specifically, there has not been received any packet from a destination of the RTS packet immediately before the time T1) is written in a category field. Further, information indicating transmission power of the RTS packet is written in a power field. Furthermore, information indicating the number of bits stored in a data packet which is expected to be transmitted immediately thereafter is written in a data length in PSDU.

This RTS packet is also received in the communication station STA2 which is located in the neighborhood of the communication station STA0. Even if the communication station STA2 failed in decoding the PSDU, there is a high possibility of decoding the PLCP header portion correctly, because the portion is excellent in noise characteristics. The time T2 is recognized from the rate field and the data length field in the PLCP header, and the time T4 is recognized by referring further to the duration field to effect transmission disapproval by setting up NAV during the time until T4.

This RTS packet is also received by the communication station STA1 which is the destination. The communication station STA1 decodes the PLCP header and may try to set up NAV during the period of time until T4 similarly to the communication station STA2 by referring to the duration field and the like in the PLCP header; however, when the STA1 further succeeds in decoding the PSDU to recognize that the packet is addressed thereto, then a setup of the NAV is not performed. Further, the STA1 recognizes that there is a transmission request for the data packet addressed thereto from the communication station STA0 and returns a CTS packet at the time T3 after an SIFS interval. The communication station STA1 evaluates a quality of the RTS packet received prior to the return of the CTS packet and based on the result of this evaluation, a transmission rate of a data packet which is transmitted thereafter is determined. Since a determination process is not a feature of this embodiment, an explanation thereof will be omitted.

After the transmission rate is determined, a time length of the data packet is calculated from the number of bits in the data packet indicated by the RTS packet and the determined transmission rate, and the period of time until T6 which is the time to finish the transmission of the data packet transmitted as the result of reception of the CTS packet is written in a duration field in a PLCP header of a CTS packet similarly to the procedure described above. There may also be a case in which time until around T7 is written so as to have some margin. Further, since the transmission of a CTS packet is performed addressing to the source of transmitting a RTS packet as the result of the reception of the RTS packet, information indicating that "there has been the exchange of the packet with the receiving side prior to the transmission of the packet" is written in a category field.

Further, transmission power indicated in the power field which has been written in the RTS packet is set as the transmission power, and a value indicating this transmission power is written in a power field. If the communication station STA1 is unable to transmit with the transmission power indicated in the power field which has been written in the RTS packet, the closest value to the transmission power indicated in the RTS packet is set within the range of transmission power with which the STA1 is able to perform transmission, and that transmission power is written in the power field of the CTS packet. Furthermore, the transmission rate determined is written in a rate field within the PSDU of the CTS packet. The transmission of the PSDU of the CTS packet itself is performed at a transmission rate which is (in many cases, the most) excellent in noise characteristics so that a possibility of not being able to decode the CTS packet can be made as low as possible.

On the other hand, when the communication station STA1 fails in decoding PSDU even though succeeded in decoding the PLCP header of the RTS packet, the communication station STA1 is also made into the transmission disapproval state by setting up NAV for the period of time until T4 indicated in the duration field or the like which has been obtained from the PLCP header. In this case, since a CTS packet is not returned from the communication station STA1 before the expected time T4, the communication station STA0 tries to resend the RTS packet in accordance with a procedure of random backoff. At this time, the communication station STA2 also takes NAV down at the time T4 to enter a normal transmissible state and a damage caused by the fact that the CTS packet has not been returned can be most minimized.

When the communication station STA1 succeeds in decoding the PDSU of the RTS packet, the CTS packet is returned as expected at the time T4 in accordance with the above described procedure. Since the CTS packet is forwarded at the transmission rate which is excellent in noise characteristics, there is a high possibility that the transmission and reception of the PDSU can be performed without an error.

This CTS packet can also be received by the communication station STA3 which is located in the neighborhood of the communication station STA1. When the communication station STA3 decodes the duration field and the like in PLCP of the CTS packet and further confirms that an RA address in PSDU is not addressed thereto, the communication station STA3 sets up NAV over the period of time indicated in the duration field and the like to stop transmission. As a result, the communication station STA3 becomes a transmission disapproval state until the time T6 which is the time indicated in the duration field.

This CTS packet is also received by the communication station STA0 which is a destination. By decoding the PSDU, the communication station STA0 recognizes that the communication station STA1 is ready for reception and also expects the reception at the transmission rate indicated in the rate field. The communication station STA0 generates a data packet at the instructed transmission rate and further writes into a duration field of the PLCP header a period of time until completing reception of an ACK packet transmitted as a result of reception of the data packet in the same procedure as described above. Moreover, since the transmission of the data packet addressing to the transmission source of the CTS packet is performed as a result of the reception of the CTS packet, information indicating that "there has been the exchange of a packet with the receiving side prior to the transmission of the relevant packet" is written in a category field.

Further, the transmission power indicated in the power field written in the CTS packet is set as a transmission power and a value indicating this transmission power is written in a power field. If the communication station STA0 is unable to transmit with the transmission power indicated in the power field written in the CTS packet, the closest value to the transmission power indicated in the CTS packet is set within the range of transmission power with which the communication station STA0 can perform transmission, and the transmission power is written in the power field of the data packet which is transmitted. The data packet generated in the above described procedure starts to be transmitted at time T5 from the CTS packet after an SIFS interval.

Further, when the transmission power of the RTS packet which has previously been transmitted differs from the transmission power indicated in the CTS packet, there is also a case in which the transmission power at the time of transmitting the RTS packet is set.

The data packet is received by the communication station STA2 which is located in the neighborhood of the communication station STA0 and by decoding information of a PLCP header in the data packet, the communication station STA2 understands that the transmission of the data packet is performed until the time T6 and also that it is expected to make transmission disapproved until time T8 after that; and the communication station STA2 sets up NAV from time T6 to time T8 to make the transmission disapproved. This process is performed even if the PSDU of the data packet can not be decoded correctly.

Naturally, the data packet is also received by the communication station STA1 which is a destination, and when the transmission of the data packet is completed at the time T6 and the communication station STA1 has been able to decode this without an error, ACK is returned at the time T7 after a SIFS interval and the communication station STA0 receives this, so that a transmission and reception transaction for one packet is completed at the time T8. Although the communication station STA1 generates an ACK packet in accordance with almost the same procedure as that at the time of generating the CTS packet, the communication station STA1 notifies neighboring stations that "there is no time zone to make transmission disapproved after completing the transmission of the ACK packet" by storing a value 0 or the like in a duration field in a PLCP header of the ACK packet.

The communication station STA3 takes NAV down at the time T6 and the communication station STA2 takes NAV down at the time T8 to return to a normal transmission and reception state.

Figure 5:
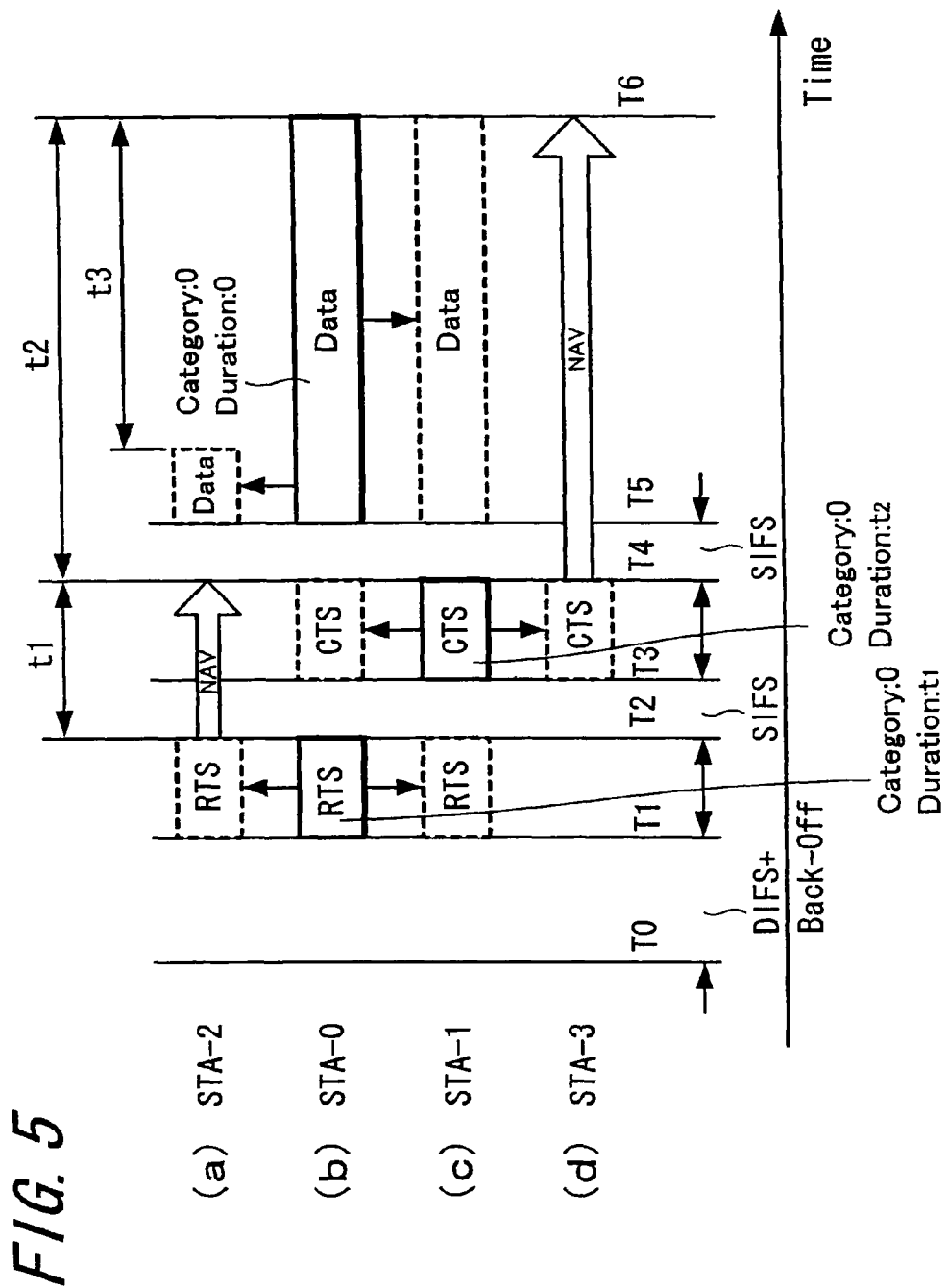
FIG. 5 is a timing chart showing an example of CSMA/CA (example 1) according to an embodiment of the present invention.

FIG. 5 is a diagram showing another example of an RTS/CTS procedure according to an embodiment of the present invention.

Similarly to the IEEE802.11, a case in FIG. 6 in which the ACK packet is returned immediately after the data packet is referred to as an example; however, there is also a case in which the ACK packet is not returned immediately after the data packet. An example of that case is described in FIG. 5.

A length of time during which transmission is expected to make disapproved after the transmission of the relevant packet is completed is written by a unit of [μ sec] in a duration field of the packet transmitted in the example of FIG. 5. However, the duration Field does not always need to include a field in which length information is written by the unit of [μ sec], and as long as the duration field includes information or information groups which can instruct communication stations other than a destination to be in a transmission disapproval state over a desired period of time, the purpose thereof can be achieved.

In a category field, a value 1 is stored when a relevant packet is transmitted without a prior notice (for example, an RTS packet), and a value 0 is stored when the packet is transmitted with a prior notice (for example, a CTS packet which is transmitted by having received the RTS packet as a trigger).

A relationship between the value of the duration field and the value of the category field is summarized in the following table.

|  | Duration Field | | | |
|---|---|---|---|---|
|  | Value of 1 or larger | Value of 1 or larger | 0 | 0 |
|  | Category Field | | | |
|  | 1 | 0 | 1 | 0 |
| State of Processing | During reception of the packet and the period of time indicated in the duration become a transmission disapproval period. | Though transmission is possible during reception of the packet, the period of time indicated in the duration becomes a transmission disapproval period. Alternatively, during reception of the packet and the period of time indicated in the duration become a transmission disapproval period. | Time until completing reception of the packet becomes a transmission disapproval period. | Transmission becomes possible at the time when recognized that both fields of the duration and category are 0. |

In the example of FIG. 5, completely the same procedure as that shown in FIG. 6 is taken until the time T5, and when the communication station STA0 transmits a data packet at the time T5, neighboring stations are notified that "there is no time period to make transmission disapproved after completing transmission of the ACK packet" by storing a value 0 in a duration field within the PLCP header or the like.

This data packet is received by the communication station STA2 located in the neighborhood of the communication station STA0, and by decoding information in the PLCP header of the data packet, the communication station STA2 recognizes that an exchange of a packet is performed with a receiving side prior to the transmission of that packet, that the transmission of that data packet is performed until the time T6 and that there exists no time period to make transmission disapproved after that; and also the communication station STA2 learns that the packet is not addressed thereto by referring to a destination address field of PSDU. Then, (after learning that the packet is not addressed thereto, that there has been the exchange of a packet with the receiving side prior to the transmission of that packet, and that there exists no time period to make transmission disapproved after completing the transmission of that packet), the communication station STA2 ends a reception operation at the time when learned that that packet is not addressed thereto and returns to a normal transmission and reception state. When the communication station STA2 possesses data which should be transmitted, a procedure for random back-off of CSMA is activated so as to activate a procedure for acquiring a transmission right.

The other procedure is the same as the one explained in FIG. 6; however, when the data packet is also received by the communication station STA1 which is the destination, and when the transmission of the data packet has finished at the time T6 and the communication station STA1 has been able to decode this data packet without error, transmission of an ACK packet is performed at another opportunity. According to the procedure shown in FIG. 5, since the communication station STA2 can avoid the state of being under the transmission disapproval period until the time T8 in the conventional method shown in FIG. 15, line efficiency will be improved.

Variation of ACK

Figure 8:
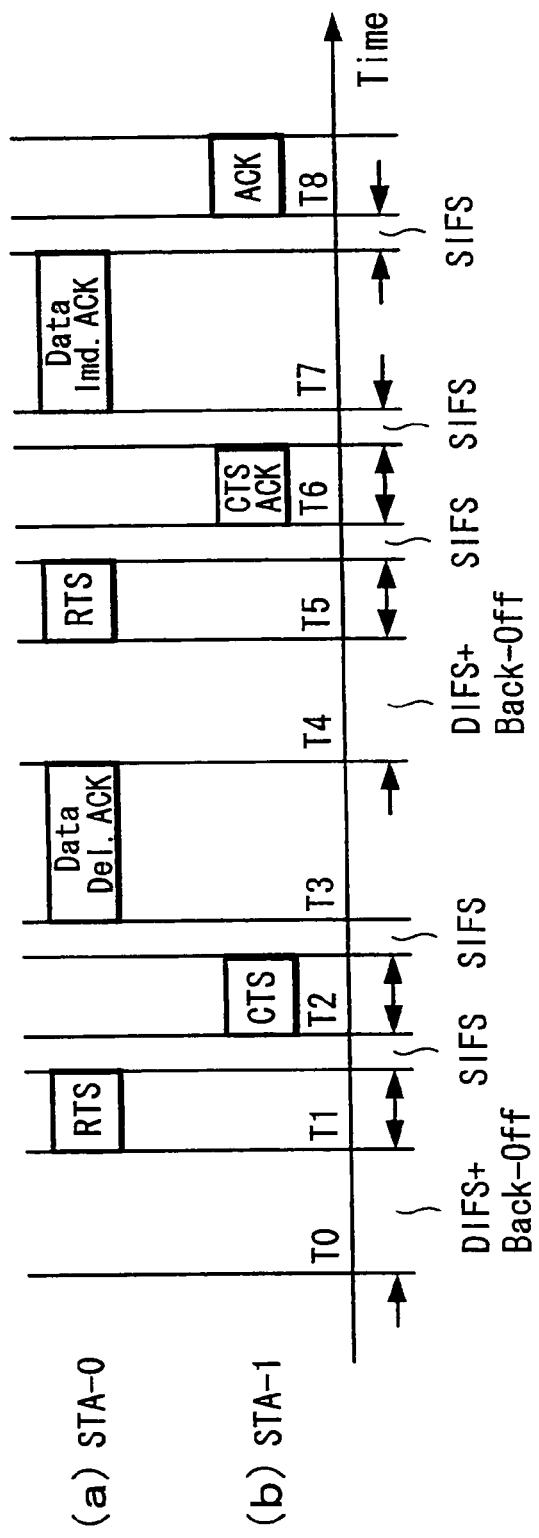
FIG. 8 is an explanatory view showing an example of a transmission and reception procedure (example 1) according to an embodiment of the present invention.
Figure 9:
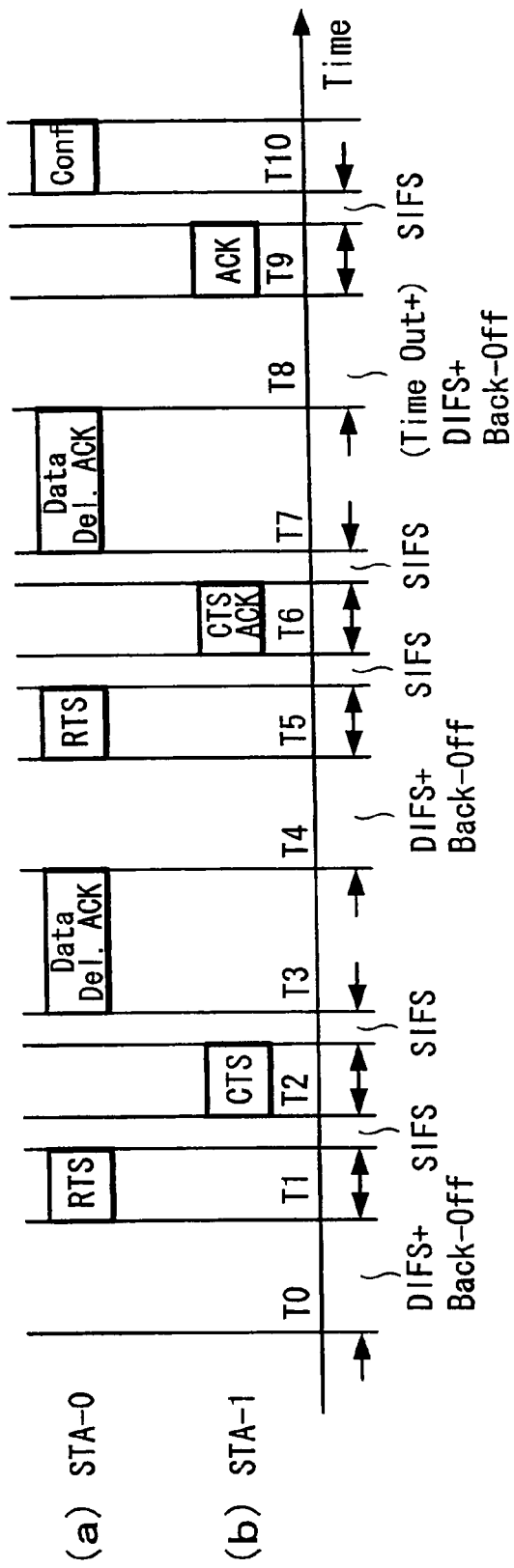
FIG. 9 is an explanatory view showing an example of a transmission and reception procedure (example 2) according to an embodiment of the present invention.
Figure 12:
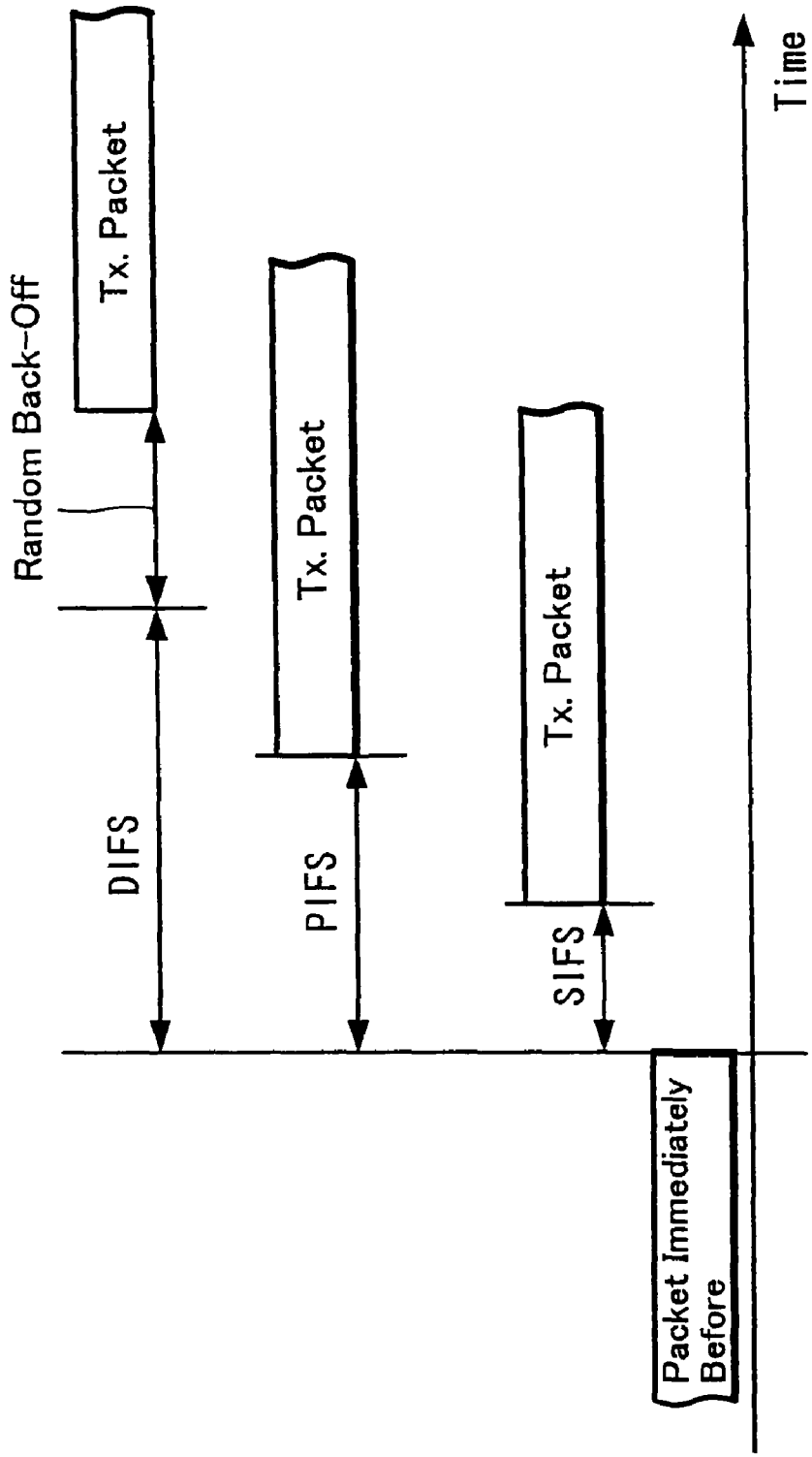
FIG. 12 is an explanatory view showing an example of a conventional packet interval.
Figure 13:
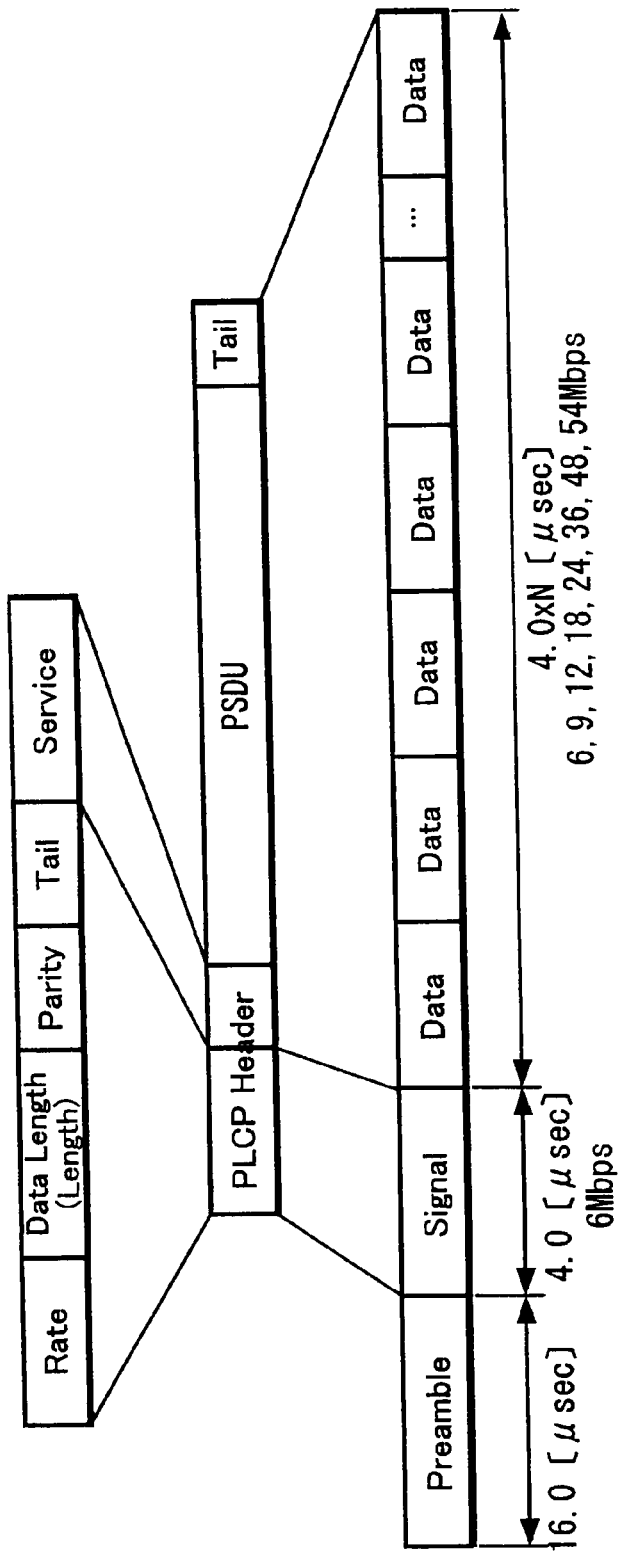
FIG. 13 is an explanatory view showing an example of a conventional frame format.

An ARQ procedure for the case in which an ACK packet is not returned immediately after transmitting a data packet as shown in FIG. 5 is explained using FIGS. 8 to 10. In this case, there exist at least two variations as a method for returning an ACK, in which an immediate ACK as shown in FIG. 5 where the ACK is returned immediately after the reception of a data packet without an error and a delayed ACK where the ACK is returned after counting a predetermined period of time until transmitting the ACK when the data packet is received without an error are defined. While the procedures shown in a conventional example and in FIG. 5 are taken by the immediate ACK, the following procedure is taken by the delayed ACK.

1. When a data packet is received without an error, a timer until transmitting an ACK packet is activated and transmission of the ACK packet is attempted at the time when the timer has come to an end (expired).

2. When transmitting some packet addressed to a destination communication station to which the ACK should be returned before the above described timer comes to an end, ACK information is also written in the data and the above described timer is reset.

The following procedure may also be taken as another example for the delayed ACK.

1. When a data packet is received without an error, the case in which the packet is received without an error is recorded; however, an ACK is not transmitted.

2. When some packet addressed to a destination communication station to which the ACK should be transmitted is made to transmit, ACK information is also written in the data to be transmitted.

3. When the ACK is not returned for a predetermined period of time with respect to the transmitted data, a request-to-resend is transmitted.

In this case, no timer for returning the ACK is included unlike the example described above. A control for transmitting a request-to-resend when the ACK is not returned for the predetermined period of time is a general resending procedure.

In the case where there are a plurality of variations in the ACK, an ACK type field indicating the manner in which the ACK is returned is defined in a control frame of data to be transmitted or others as shown in FIG. 7, and a transmitting side writes request information indicating the manner in which the ACK is returned from a receiving side in the field in an RTS frame and a data frame, and confirmation information indicating the manner in which the ACK is returned is written in the field in a CST frame. Further, since there is a possibility that each of the frames is shared by ACK, an ACK SEQ field is defined. The ACK SEQ field is used as follows.

For example, a case in which the communication station STA0 transmits a link layer packet having a SEQ number 023 towards the communication station STA1 is assumed. At this time, the number 023 is written in a SEQ field of the data packet. For example, when returning a notice that this data packet has been received, the number 023 is written in the ACK SEQ field. Since the notice that the data packet has been received can be returned in either frame of RTS/CTS/Data/ACK, the ACK SEQ field is defined in all of the frames shown in FIG. 7. Hereupon, for the convenience of simplifying an explanation, only one ACK SEQ field is described; however, practically a plurality of ACK SEQ fields may exist in each frame.

Explanation of an Example in FIG. 8

FIG. 8 is a diagram showing a first example of a transmission and reception procedure in a wireless communication system of this embodiment. Hereupon, a case in which two data packets addressed to the communication station STA1 are transmitted from the communication station STA0 is referred to as an example.

The communication station STA0 activates a transmission procedure of a data packet at time T0 to start a back-off count in accordance with the procedure of CSMA in order to acquire a transmission right. Since the back-off count is completed at time T1 and it is confirmed that a medium is clear during this period of time, an RTS packet is transmitted. At this time, information on requesting that an ACK be returned by a delayed ACK is written in an ACK type field of the RTS packet, and information indicating that the packet is not shared by ACK information is written in an ACK SEQ field.

The communication station STA1 which has received the above returns a CTS packet at time T2. At this time, confirmation information that the ACK is returned by the delayed ACK as instructed is written in an ACK type field of the CTS packet, and information indicating that the packet is not shared by ACK information is written in an ACK SEQ field.

The communication station STA0 which has received the above transmits a data packet at time T3. At this time, the information on requesting that the ACK be returned by the delayed ACK (Del. Ack) is written again in a ACK type field of the data packet, information indicating that the packet is not shared by ACK information is written in an ACK SEQ field, and a sequence number (for example, 023) of the packet is written in an SEQ field.

The communication station STA1 which has received the above activates a timer for returning an ACK at time T4. Further, before the timer comes to an end, the communication station STA0 transmits an RTS packet at time T5 after having a delay of random period of time so as to again transmit the data packet addressed to the communication station STA1. At this time, information on requesting that the ACK be returned this time by an immediate ACK is written in an ACK Type field of the RTS packet, and information indicating that the packet is not shared by ACK information is written in an ACK SEQ field.

The communication station STA1 which has received the above returns a CTS packet at time T6. At this time, information confirming that the ACK is returned by the immediate ACK is written in an ACK type field of the CTS packet. Further, since the communication station STA1 holds the ACK addressed to the communication station STA0 which has not yet been transmitted, ACK information which is a reception acknowledgement response of the previously received packet of the sequence number 023 is made to share the ACK SEQ field, and the sequence number 023 of the data frame which is an object of the ACK is written in the ACK SEQ field.

The communication station STA0 which has received the above transmits the next data packet at time T7 while confirming that previous data frame has been received without an error. At this time, the information on requesting that the ACK be returned by the immediate ACK (Imd. Ack) is again written in an ACK type field of the data packet, information indicating that the packet is not shared by ACK information is written in an ACK SEQ field, and a sequence number (for example, 024) of the packet is written in an SEQ field.

Since the communication station STA1 which has received the above has recognized that the ACK is expected to be sent immediately, an ACK packet is returned immediately at time T8 this time. The previously received sequence number 024 is written in an ACK SEQ field of the ACK packet.

Explanation of an Example in FIG. 9

FIG. 9 is a diagram showing a second example of a transmission and reception procedure in a wireless communication system of this embodiment. Also in this example, a case in which two data packets addressed to the communication station STA1 are transmitted from the communication station STA0 is referred to as an example.

In the first example shown in FIG. 8, the case in which the delayed ACK is instructed in the first data packet transmitted from the communication station STA0 and the immediate ACK is instructed in the second data packet therefrom is shown. In the second example shown in FIG. 9, a case in which the delayed ACK is instructed in both the data packets is shown. Since the process up to the time T4 is the same as that of the first example of FIG. 8, an explanation thereof is omitted.

Similarly to the first example described above, the communication station STA1 activates a timer for returning an ACK at the time T4.

Before this timer comes to an end, the communication station STA0 transmits an RTS packet at the time T5 after having a delay of random period of time so as to again transmit a data packet addressed to the communication station STA1. At this time, information on requesting that an ACK be returned again by the delayed ACK is written in an ACK type field of the RTS packet, and information indicating that the packet is not shared by ACK information is written in an ACK SEQ field.

The communication station STA1 which has received the above returns a CTS packet at the time T6. At this time, information confirming that the ACK is returned by the delayed ACK as instructed is written in an ACK type field of the CTS packet. Further, since the communication station STA1 holds the ACK addressed to the communication station STA0 which has not been transmitted, ACK information which is a reception acknowledgement response of the previously received packet of the sequence number 023 is made to share an ACK SEQ field and the sequence number 023 of the data frame which is an object of the ACK is written in the ACK SEQ field.

The communication station STA0 which has received the above transmits the next data packet at the time T7 while confirming that the previous data frame has been received without an error. At this time, the information on requesting that the ACK be returned by the delayed ACK is again written in an ACK type field of the data packet, information indicating that the packet is not shared by ACK information is written in an ACK SEQ field, and a sequence number (for example, 024) of the packet is written in an SEQ field.

The communication station STA1 which has received the above activates the timer for returning the ACK after confirming that the information has been taken out without an error. This time, since transmission of a packet addressed to the communication station STA0 has not occurred during a period until the timer comes to an end, the communication station STA1 activates the transmission process of an ACK frame addressed to the communication station STA0. When the timer comes to an end, the ACK frame is transmitted at time T9 after having a delay of random period of time so as to transmit the ACK frame. At this time, the number 024 which is the sequence number of the previously received data frame is written in an ACK SEQ field.

The communication station STA0 which has received the above immediately transmits a response signal for that ACK frame at time T10 while recognizing that the data packet of the sequence number 024 has been decoded without an error by extracting the ACK SEQ field of the ACK frame. The response signal is required to have only a similar field as a conventional ACK frame.

In the above examples, although an explanation is made by referring to an example of a case in which a station involved in the transmission and reception of the delayed ACK and having received data without an error sets the timer for returning the ACK, almost the same sequence is taken even when the timer for returning the ACK is not included.

In that case, a difference between the case and the above described FIG. 9 occurs at and after the time T9.

Although the communication station STA1 holds the ACK information which has not yet been returned, this has not been transmitted. At this point of time, the communication station STA0 judges that the sequence number 024 might not have been received based on the fact that an ACK for the packet of the sequence number 024 which was transmitted previously at the time T7 has not been returned over a predetermined period of time; and transmits an RTS packet for request-to-resend at the time T9 (not shown in the figure). The communication station STA1 which has received the above returns a CTS packet at the time T10 after writing ACK information indicating that the packet has already been received (there is also a case in which an ACK packet is returned instead of the CTS packet). At this time, since the communication station STA1 does not request to resend, a value 0 is stored in a duration field of the CTS (ACK) packet. The communication station STA0 which has received this CTS packet recognizes that the packet of the sequence number 024 has been received without any trouble.

Although a field indicating a communication station of the transmission source does not exist in the ACK frame in the above described example, there is also a case in which the field indicating the communication station of the transmission source exists in the ACK flame.

Explanation of an Example in FIG. 10

FIG. 10 is a diagram showing a third example of a transmission and reception procedure in a wireless communication system of this embodiment. Also in this example, a case in which two data packets addressed to the communication station STA1 are transmitted from the communication station STA0 is referred to as an example.

In the examples shown in FIG. 8 and FIG. 9, the examples in which the communication station STA0 follows the procedure of the random back-off prior to the transmission of the second data packet are shown. In the third example shown in FIG. 10, a case in which an immediate ACK is instructed in both data packets and a transmitting station is allowed to transmit consecutive data packets is shown as an example.

The communication station STA0 activates a transmission procedure of a data packet at time T0 to start a back-off count in accordance with the procedure of CSMA in order to acquire a transmission right. At time T1, since the back-off count is completed and it is confirmed that a medium is clear during this period of time, an RTS packet is transmitted. At this time, information requesting that an ACK be returned by an immediate ACK is written in an ACK type field of the RTS packet, and information indicating that the packet is not shared by ACK information is written in an ACK SEQ field.

The communication station STA1 which has received the above returns a CTS packet at time T2. At this time, information confirming that the ACK is returned by the immediate ACK as instructed is written in an ACK type field of the CTS packet, and information indicating that the packet is not shared by the ACK information is written in an ACK SEQ field.

The communication station STA0 which has received the above transmits a data packet at time T3. At this time, the information requesting that the ACK be returned by the immediate ACK is again written in an ACK type field of the data packet, the information indicating that the packet is not shared by the ACK information is written in an ACK SEQ field, and a sequence number (for example, 023) of the packet is written in an SEQ field. Further, it is informed in a category field or the like that the data packet also functions as an RTS message for the next data packet.

The communication station STA1 which has received the above returns an immediate ACK at time T4. The previously received sequence number 023 is written in an ACK SEQ field of the ACK packet. Further, it is informed in a category field or the like that the ACK packet also functions as a CTS message for the next data packet.

The communication station STA0 which has received the above transmits the next data packet at time T5 while confirming that the previous data frame has been received without an error. At that time, the information requesting that the ACK be returned by the immediate ACK is again written in an ACK type field of the data packet, information indicating that the packet is not shared by ACK information is written in an ACK SEQ field, and a sequence number (for example, 024) of the packet is written in an SEQ field.

Since the communication station STA1 which has received the above has recognized that the ACK is expected to be sent immediately, an ACK packet is returned immediately at time T6 this time. The previously received sequence number 024 is written in an ACK SEQ field of the ACK packet.

In addition, it can be considered to transmit the CTS at a transmission rate which is resistant to noise. Since a duration field or the like is not written in a PLCP header, there may exist a case in which the duration field or the like can not be extracted without an error in a remote communication station depending on a transmission rate of an information unit. However, in CSMA/CA which together uses the RTS/CTS procedures it is necessary to transmit the CTS also to a communication station which has a possibility of becoming an interference source.

Accordingly, with respect to a CTS packet, if transmission is performed at a transmission rate which is the most resistant to a noise regardless of a transmission rate of a data packet or the like, it becomes possible to reduce interference during reception of a data packet, so that transmission and reception can be performed efficiently.

It should be noted that though an explanation is made to the examples of a communication device exclusively performing transmission and reception in the above described embodiment, it is also possible that, for example, after mounting a board, card or the like for performing equivalent communication processing to a transmission unit or a reception unit of this embodiment on a personal computer device which performs various sets of data processing, a software is installed to make processing in a base-band unit performed by an arithmetic processing means on the computer device side.

What is claimed is:

1. A communication device performing access control in a network constituted of a plurality of communication devices such that communication timing of a packet will not collide with communication timing of another device by detecting a signal transmitted from another device, the communication device comprising;
   a transmission and reception unit configured to transmit a request-to-send packet to a second communication device in the network, receive from the second communication device a request-to-send acknowledgement response packet relative to the request-to-send packet, transmit a data packet to the second communication device in response to reception of the request-to-send acknowledgement response packet, and receive from the second communication device a packet concerning a reception acknowledgement response relative to the data packet; and
   a control unit configured to write first information on a period of time until reception of the request-to-send acknowledgement response packet is completed in the request-to-send packet and second information on a period of time until reception of the packet concerning the reception acknowledgement response relative to the data packet is completed in the data packet, wherein
   based on the first information and the second information, a third communication device in the network is prohibited from performing transmission processing, and
   the packet concerning the reception acknowledgement response relative to the data packet is not transmitted immediately following reception of the data packet.

2. The communication device according to claim 1, wherein third information on a period of time until transmission of the data packet is completed by the communication device or a period of time until reception of the packet concerning the reception acknowledgement response relative to the data packet is completed by the communication device is written in the request-to-send acknowledgement response packet, and based on the third information, the third communication device is prohibited from performing transmission processing.

3. A communication method for performing in a network constituted of a plurality of communication devices access control such that communication timing of a packet will not collide with communication timing of another device by detecting a signal transmitted from another device, the method comprising steps of:
   transmitting a request-to-send packet from a first communication device in the network to a second communication device in the network, the first communication device receiving a request-to-send acknowledgement response packet relative to the request-to-send packet from the second communication device, transmitting to the second communication device a data packet in response to reception of the request-to-send acknowledgement response packet, and receiving a packet concerning a reception acknowledgement response relative to the data packet from the second communication device, wherein
   first information on a period of time until reception of the request-to-send acknowledgement response packet is completed by the first communication device is written in the request-to-send packet, and second information on a period of time until reception of the packet concerning the reception acknowledgement response relative to the data packet is completed by the first communication device is written in the data packet,
   prohibiting a third communication device in the network from performing transmission processing, based on the first information or the second information, and
   the packet concerning the reception acknowledgement response relative to the data packet is not transmitted immediately following reception of the data packet.

4. A communication system performing in a network constituted of a plurality of communication devices access control such that communication timing of a packet will not collide with communication timing of another device by detecting a signal transmitted from another device, the system comprising:
   a first communication device,
   a second communication device; and
   a third communication device;
   wherein the first communication device, the second communication device, and the third communication device constitute a network, wherein
   the first communication device transmits a request-to-send packet to the second communication device, receives from the second communication device a request-to-send acknowledgement response packet relative to the request-to-send packet, transmits a data packet to the second communication device in response to reception of the request-to-send acknowledgement response packet, and receives from the second communication device a packet concerning a reception acknowledgement response relative to the data packet,
   first information on a period of time until reception of the request-to-send acknowledgement response packet is completed by the first communication device is written in the request-to-send packet, and second information on a period of time until reception of the packet concerning the reception acknowledgement response relative to the data packet is completed by the first communication device is written in the data packet,
   based on the first information and the second information, the third communication device is prohibited from performing transmission processing, and
   the packet concerning the reception acknowledgement response relative to the data packet is not transmitted immediately following reception of the data packet.

* * * * *